US012062514B2

(12) United States Patent
Reidt

(10) Patent No.: US 12,062,514 B2
(45) Date of Patent: Aug. 13, 2024

(54) CIRCUIT BREAKER AND METHOD FOR OPERATING A CIRCUIT BREAKER

(71) Applicant: Eaton Intelligent Power Limited, Dublin (IE)

(72) Inventor: Georg Reidt, Dublin (IE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 72 days.

(21) Appl. No.: 17/759,971

(22) PCT Filed: Feb. 5, 2021

(86) PCT No.: PCT/EP2021/052835
§ 371 (c)(1),
(2) Date: Aug. 2, 2022

(87) PCT Pub. No.: WO2021/156454
PCT Pub. Date: Aug. 12, 2021

(65) Prior Publication Data

US 2023/0062435 A1 Mar. 2, 2023

(30) Foreign Application Priority Data

Feb. 7, 2020 (GB) .................................... 2001691

(51) Int. Cl.
*H01H 71/16* (2006.01)
*H01H 37/52* (2006.01)
(Continued)

(52) U.S. Cl.
CPC .......... *H01H 71/164* (2013.01); *H01H 37/52* (2013.01); *H01H 37/72* (2013.01); *H01H 71/04* (2013.01); *H01H 2071/048* (2013.01)

(58) Field of Classification Search
CPC ...... H01H 71/164; H01H 37/52; H01H 37/72; H01H 71/04; H01H 2071/048
(Continued)

(56) References Cited

U.S. PATENT DOCUMENTS 4,417,222 A * 11/1983 Schmitt .................. H01H 71/52
335/23
4,706,073 A * 11/1987 Vila Masot ............ H01H 71/04
337/206
(Continued)

FOREIGN PATENT DOCUMENTS

| | | | |
|---|---|---|---|
| EP | 2290666 | A1 | 3/2011 |
| EP | 3016126 | A1 | 5/2016 |
| KR | 20130003874 | U | 6/2013 |

*Primary Examiner* — Anatoly Vortman
(74) *Attorney, Agent, or Firm* — LEYDIG, VOIT & MAYER, LTD.

(57) ABSTRACT

A circuit breaker and method for operating a circuit breaker. The circuit breaker includes a first and a second breaker terminal, a bimetal strip, a first conduction line, a switch with a first and a second contact, a triggering device mechanically coupling the bimetal strip to the switch, a magnet and a detection device comprising a magnetic field sensor configured to detect a magnetic field of the magnet. The first conduction line is electrically coupled to the first breaker terminal and to the first contact and is wound around the bimetal strip. The magnet is connected to at least one of the bimetal strip, the triggering device and the switch.

15 Claims, 4 Drawing Sheets

(51) Int. Cl.
*H01H 37/72* (2006.01)
*H01H 71/04* (2006.01)

(58) Field of Classification Search
USPC ...................... 337/54, 90, 98, 134, 344, 366
See application file for complete search history.

(56) References Cited

U.S. PATENT DOCUMENTS

| | | | | | |
|---|---|---|---|---|---|
| 5,831,509 | A * | 11/1998 | Elms | H01H 71/16 | 335/37 |
| 5,894,259 | A * | 4/1999 | Kolberg | H01H 71/16 | 335/10 |
| 6,104,592 | A | 8/2000 | Pohl | | |
| 6,515,569 | B2 * | 2/2003 | Lias | H01H 71/48 | 361/99 |
| 6,816,055 | B2 * | 11/2004 | Weber | H01H 71/7436 | 337/84 |
| 7,518,482 | B2 * | 4/2009 | Fleege | H01H 71/16 | 337/72 |
| 7,800,478 | B2 * | 9/2010 | Puhalla | H01H 71/40 | 335/145 |
| 8,093,984 | B2 * | 1/2012 | Hofmann | H01H 71/1081 | 335/145 |

* cited by examiner

CIRCUIT BREAKER AND METHOD FOR OPERATING A CIRCUIT BREAKER

FIELD

The disclosure relates to a circuit breaker and a method for operating a circuit breaker.

BACKGROUND

A circuit breaker can be set in an open position and in a closed position. The circuit breaker may be a motor protective circuit breaker (in German Motorschutzschalter). Typically, a circuit breaker comprises an operating handle to manually set the circuit breaker in the open or the closed position. Additionally, the circuit breaker is configured to automatically set itself in the open position in case a current flowing through the circuit breaker is above a predetermined value for some time or in case of a short circuit. In the open position, no current flows through the circuit breaker. For example, the circuit breaker can be used for the protection of an electrical motor or another electrical load.

The circuit breaker comprises at least one switch. The circuit breaker may comprise an auxiliary switch that is coupled to the at least one switch of the circuit breaker and also changes its position in the case that the switch of the circuit breaker changes its position from open to closed or vice versa. A connection of the auxiliary switch to a control device may be used to provide information about the closed or open position of the circuit breaker to the control device.

It is an object to provide a circuit breaker and a method for operating a circuit breaker which can provide information about the status of the circuit breaker with high efficiency.

SUMMARY

The definitions as described above also apply to the following description unless otherwise stated.

In an embodiment, a circuit breaker comprises a first and a second breaker terminal, a bimetal strip, a first conduction line, a switch with a first and a second contact, a triggering device mechanically coupling the bimetal strip to the switch, a magnet and a detection device. The first conduction line is electrically coupled to the first breaker terminal and to the first contact and is wound around the bimetal strip. The magnet is connected to at least one of the bimetal strip, the triggering device and the switch. The detection device comprises a magnetic field sensor for detecting a magnetic field of the magnet.

Advantageously, the magnetic field sensor of the detection device detects the magnetic field of the magnet. The bimetal strip, the triggering device or the switch are mechanically moved parts of the circuit breaker. Since the magnet is connected to one of the mechanically moved parts of the circuit breaker, a position of the mechanically moved part is detected by the magnetic field sensor. Thus, the detection device is configured to determine information about a state of the circuit breaker. Thus, the state of the circuit breaker is detected by an electric method.

In an embodiment, the first conduction line includes a wire or a conducting strip that is spiraled around the bimetal strip. The wire or the conducting strip are configured to generate heat in case of a current flow. The wire or the conducting strip are a resistive heater.

In an embodiment, the triggering device sets the switch in an open position in case the bimetal strip is heated above a predetermined temperature by current that flows through the first conduction line. The predetermined temperature may be set with a tolerance.

In a further development, the triggering device sets the switch in the open position in case a value of the current is higher than a first predetermined value of the current for a predetermined time.

In an embodiment, the triggering device converts the movement of a movable end of the bimetal strip to a movement of an operating shaft of the switch.

In an embodiment, the magnetic field sensor comprises a magnetic resistance sensor.

In an embodiment, the magnetic resistance sensor is realized as one of an anisotropic magnetic resistance sensor (abbreviated as AMR), giant magnetic resistance sensor (abbreviated as GMR) and a tunneling magnetic resistance sensor (abbreviated as TMR).

In an embodiment, the magnetic field sensor comprises a Hall-effect sensor.

The magnetic field sensor may be realized as a linear position sensor or a rotary angular position sensor.

In an embodiment, the detection device converts a position information of the position of the magnet into a detection signal. The detection signal is an electrical detection signal.

In an embodiment, the detection device is configured to supply the detection signal representative of a position of at least one of the bimetal strip, the triggering device and the switch (e.g. of the operating shaft of the switch, the contact bridge of the switch and/or the at least one movable contact of the switch).

In an embodiment, the detection signal may be realized as an analog signal. The analog signal is a function of the position of the magnet, e.g. a linear or a non-linear function.

In an embodiment, the detection signal may be realized as a digital signal. The digital signal may be a one bit signal; for example the detection signal indicates a tripped circuit breaker. Alternatively, the digital signal provides more than one bit. The digital signal may indicate the position of the magnet with a resolution of more than one bit.

In an embodiment, the detection signal is realized as a pulse-width modulated signal.

In an embodiment, the pulse-width modulated signal has a duty cycle. The duty cycle is a function of the position of the magnet, e.g. a linear or a non-linear function.

In an alternative embodiment, the detection signal is realized as an analog signal such as a 0 to 20 mA signal or a 0 to 10 V signal.

In an alternative embodiment, the detection signal is realized as a digital signal such as a bus signal.

In an embodiment, the detection signal is set in case a load is above a first threshold.

In an embodiment, the detection device converts the position information of the position of the magnet into a further detection signal. The further detection signal may be set in case the load is above a second threshold.

The load may be e.g. a value of the current flowing through the first conduction line, a value of the temperature of the bimetal strip or a value of the position of the magnet. Values above 100% indicate an overload. Values up to 100% indicate a normal load. The first and the second threshold are different. The first and the second threshold may be e.g. at 105% and 115% of a nominal value or a continuous limit value of the current, the temperature or the position.

In an embodiment, the detection device comprises a control circuit and at least a first output terminal. The control circuit is connected to the magnetic field sensor and to the at least a first output terminal.

The control circuit may comprises a communication module.

In an embodiment, the circuit breaker comprises a first and a second housing. The first housing at least encloses the bimetal strip, the first conduction line, the switch, the triggering device and the magnet.

In an embodiment, the second housing at least encloses the detection device.

The shape of the first housing may be adapted to the shape of the second housing.

The second housing may be formed such that it can be fixed at a side of the first housing. The first and the second housing may be interconnected.

In an embodiment, the circuit breaker comprises an operating handle that is configured to manually set the circuit breaker in an open or a closed position and is mechanically connected to the triggering device.

The operating handle may be intended for manual release. The operating handle may be implemented e.g. as a twist handle, a toggle switch or a push button.

In an embodiment, the switch comprises at least one fixed contact and at least one movable contact. A fixed contact may be named stationary contact. The at least one fixed contact is non-movable mounted in the first housing. The at least one movable contact is movable mounted in the first housing. The triggering device may be operatively connected to the at least one movable contact via the operating shaft of the switch.

In an embodiment, the first and the second contact of the switch are realized as a fixed contact and a movable contact. The operating shaft of the switch is connected to the movable contact of the switch.

In an alternative embodiment, the first and the second contact of the switch are both realized as fixed contacts. The switch additionally comprises a first and a second movable contact. The switch comprises a contact bridge coupling the first to the second movable contact. The operating shaft of the switch is connected via the contact bridge to the first and the second movable contact.

In an embodiment, the triggering device performs opening and closure of the switch. The switch has a first and a second operating position which are implemented as open and closed position.

The triggering device may be realized as a tripping device, a switch mechanical system and/or an actuation device. The triggering device may comprise a spring.

In an embodiment, the circuit breaker is implemented as a thermal magnetic circuit breaker.

In an embodiment, a method for operating a circuit breaker comprises flowing a current from a first breaker terminal to a second breaker terminal via a first conduction line and a switch, heating a bimetal strip by the first conduction line, moving a magnet as a function of the heat provided to the bimetal strip and detecting a magnetic field of the magnet by a detection device comprising a magnetic field sensor. The conduction line is wound around the bimetal strip. The bimetal strip is mechanically coupled to the switch via a triggering device. The magnet is connected to at least one of the bimetal strip, the triggering device and the switch.

Advantageously, the current that flows through the first conduction line results in a movement of the magnet and the movement is detected by the magnetic field sensor. Thus, the detection device is configured to gain information about the position of the circuit breaker.

The method for operating a circuit breaker may be implemented e.g. by the circuit breaker according to one of the examples described above.

In an example, the circuit breaker is configured for an overload indication with the magnetic field sensor such as an AMR sensor. The circuit breaker is able to provide an information about its overload situation. The detection and evaluation of the overload state of the circuit breaker can be implemented by the magnet and the magnetic field sensor. The magnet may be a permanent magnet. The magnet may be attached at a movable bridge of the triggering device. The movable bridge connects the three bimetal strips to the further parts of the triggering device. The magnetic field sensor is attached such that it can detect the movement of the magnet and consequently also of the bridge of the triggering device.

The circuit breaker can be fabricated as motor-protection switch, overload protection switch or overload relay.

The detection device can be attached to the first housing and can also be detached. Thus, the magnetic field sensor is outside of the first housing and detects the movement of the magnet inside the first housing.

In an embodiment, the overload warning is evaluated in a control device and can be processed further. The control device may be realized as a programmable logic controller, abbreviated as PLC, in German speicherprogrammierbare Steuerung, abbreviated SPS. The overload warning can e.g. be forwarded via the control device and used for predictive maintenance applications. Furthermore, in case of overload, the control device can send a warning message to the circuit breaker to switch off the assigned contactor or load before the circuit breaker trips. This allows a selectable overload relay function (in German Überlastrelaisfunktion; abbreviated ZMR function) to be implemented. Furthermore, in case of overload, the control device can send a switch off control signal to the assigned contactor of the circuit breaker before the circuit breaker trips.

To achieve that the ZMR function is independent of the control device, the control signal could possibly control a simple control module on the contactor and thus also realize the ZMR function.

The following description of figures of embodiments shall further illustrate and explain aspects of the circuit breaker. Parts and components with the same structure and the same effect, respectively, appear with equivalent reference symbols. Insofar as parts and components correspond to one another in terms of their function in different figures, the description thereof is not repeated for each of the following figures.

DETAILED DESCRIPTION

Figure 1A:
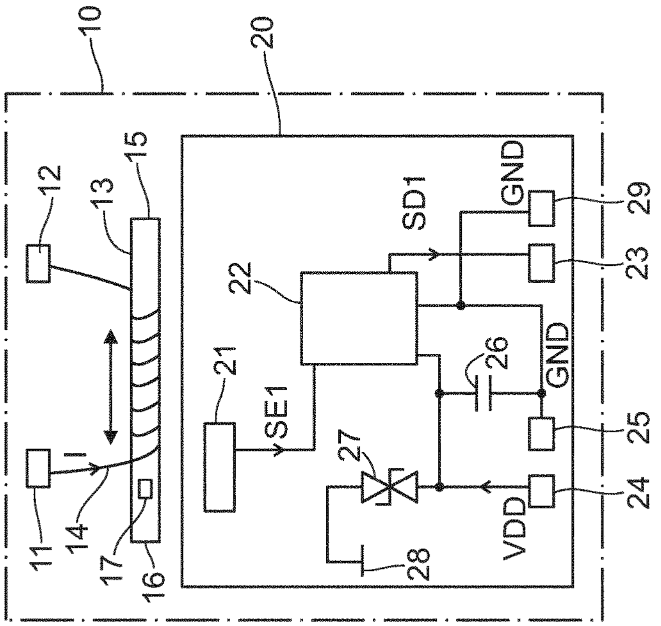
FIGS. 1A to 1C show examples of a circuit breaker.

FIG. 1A shows a schematic of an example of a circuit breaker 10 having a first and a second breaker terminal 11, 12. For example, the first breaker terminal 11 can be connected to an electrical power source (not shown) and the second breaker terminal 12 can be connected to a motor (not shown). Moreover, the circuit breaker 10 comprises a bimetal strip 13 and a first conduction line 14. The first conduction line 14 is electrically connected to the first breaker terminal 11. The first conduction line 14 is wound around the bimetal strip 13. The first conduction line 14 is coupled to the second breaker terminal 12 via a not-shown switch of the circuit breaker 10. The bimetal strip 13 has a fixed end 15 and a movable end 16. The circuit breaker 10 comprises a magnet 17 that may be attached to the bimetal strip 13. The magnet 17 may be fixed at the movable end 16 of the bimetal strip 13.

Moreover, the circuit breaker 10 comprises a detection device 20 including a magnetic field sensor 21. The magnetic field sensor 21 is arranged in the vicinity of the magnet 17. The magnetic field sensor 21 is located in a magnetic field of the magnet 17. The detection device 20 comprises a control circuit 22 that is connected to the magnetic field sensor 21. The control circuit 22 may be implemented as an application-specific integrated circuit, abbreviated as ASIC. The control circuit 22 may be realized as a microcontroller or microprocessor. The control circuit 22 may be fabricated as single chip solution. The control circuit 22 is connected on its output side to a first output terminal 23 of the detection device 20. The detection device 20 comprises a first supply terminal 24 that may be assigned for receiving a supply voltage VDD. The supply voltage VDD may be a direct current voltage, abbreviated DC voltage. For example, the supply voltage VVD may have a value of 24 V. The detection device 20 includes a reference potential terminal 25.

The first supply terminal 24 and the reference potential terminal 25 are connected to the control circuit 22. Moreover, the first supply terminal 24 and the reference potential terminal 25 may be connected to the magnetic field sensor 21 by not-shown conduction lines. A smoothing capacitor 26 of the detection device 20 may be coupled between the first supply terminal 24 and the reference potential terminal 25. The detection device 20 comprises a protection device 27 that is connected to the first supply terminal 24 and to an internal reference potential terminal 28. The internal reference potential terminal 28 may be directly connected to the reference potential terminal 25. The protection device 27 may be realized as a Zener diode or a bidirectional suppressor diode. The protection device 27 increases the electromagnetic compatibility (abbreviated as EMC) of the detection device 20.

A second output terminal 29 of the detection device 20 is connected to the reference potential terminal 25. A reference potential GND is provided at the reference potential terminal 25. In FIG. 1A, a possible terminal assignment of the detection device 20 is illustrated.

In the case that the circuit breaker 10 is set in a closed position (which may be named conducting state), a current I flows through the first conduction line 14. The current I results in an increase of the temperature of the conduction line 14 and thus of the bimetal strip 13. The increase of the temperature of the bimetal strip 13 results in a movement of the movable end 16 of the bimetal strip 13. In the case that the current I is very low, this movement remains very low. Typically, the bimetal strip 13 changes its bending when heated.

The magnetic field sensor 21 detects a magnetic field generated by the magnet 17. The magnetic field sensor 21 may be realized as a magnetic resistance sensor such as an anisotropic magnetic resistance sensor, abbreviated as AMR sensor. The magnetic field sensor 21 generates a sensor signal SE1 that is provided to the control circuit 22. The control circuit 22 generates a detection signal SD1 and provides it to the first output terminal 23. The detection signal SD1 is an electrical detection signal. The detection signal SD1 may be realized as a pulse width modulated signal. A duty cycle of the pulse width signal depends on the sensor signal SE1 and thus depends on the position of the magnet 17.

In case the current I changes the position of the magnet 17 via a temperature rise of the bimetal strip 13, the duty cycle of the detection signal SD1 is changed. The duty cycle of the detection signal SD1 represents the position of the magnet 17 and thus a temperature of the bimetal strip 13. FIG. 1A only shows a schematic of the circuit breaker 10, wherein several parts of the circuit breaker 10 are omitted. In the example as shown in FIG. 1A, the circuit breaker 10 can switch and control one current path.

The control circuit 22 may evaluate the sensor signal SE1 regarding at least one of the following features:

The control circuit 22 may determine the absolute position of the magnet 17. This value corresponds to the thermal memory or history.

The control circuit 22 may determine the velocity of movement of the magnet 17. This value may provide an information about the trigger time, such as an expected trigger time.

The control circuit 22 may determine the direction of movement of the magnet 17. The direction in case of heating is opposite to the direction in case of cooling of the bimetal strip 13. The detection of heating may result in a signal to trigger the circuit breaker 10 or to switch off a load.

In an alternative embodiment, not shown, the detection device 20 comprises a voltage converter that converts the supply voltage VDD to a lower voltage (e.g. 3.3 Volt) that is provided to the control circuit 22 and/or to the magnetic field sensor 21.

In an alternative embodiment, not shown, the detection device 20 comprises a relay or solid state contact that is connected on the output side to the first output terminal 23. In this case, the output may not be realized as an "active output".

Figure 1C:
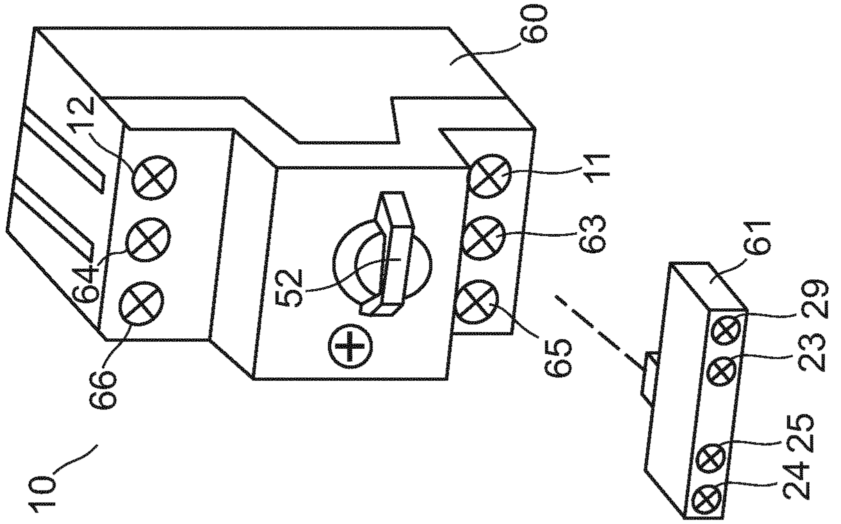
Figure 1B:
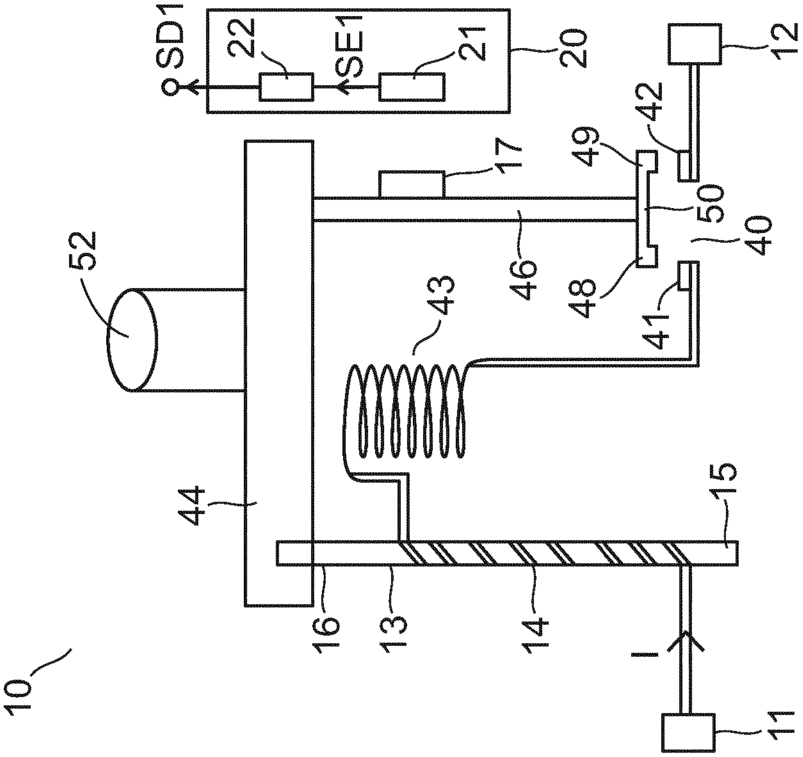

FIG. 1B shows a further example of the circuit breaker 10 that is a further development of the example shown in FIG. 1A. The circuit breaker 10 comprises a switch 40 having a first and a second contact 41, 42. The first contact of the switch 40 is coupled to the first conduction line 14. The second contact 42 of the switch 40 is coupled to the second breaker terminal 12. In a typical embodiment, the circuit breaker 10 comprises a coil 43 that is also included in the conduction path between the first breaker terminal 11 and the second breaker terminal 12. For example, the coil 43 couples the first conduction line 14 to the switch 40. Thus, the first breaker terminal 11 is electrically connected via a series circuit of the first conduction line 13, the coil 43 and the switch 40 to the second breaker terminal 12. However, the order of the elements—the first conduction line 13, the coil 43 and the switch 40—can be interchanged in this series connection.

Moreover, the circuit breaker 10 comprises a triggering device 44. The movable end 16 of the bimetal strip 13 is mechanically connected to the triggering device 44. The triggering device 44 is mechanically connected to the switch 40. For example, the switch 40 comprises an operating shaft 46 and at least one movable contact 48. The triggering device 44 is mechanically coupled via the operating shaft 46 to the at least one movable contact 48.

In the embodiment shown in FIG. 1B the switch 40 has a first and a second fixed contact. The first and the second contact 41, 42 of the switch 40 are realized as the first and the second fixed contact. Moreover, the switch 40 comprises a first and a second movable contact 48, 49 and a contact bridge 50 that connects the first movable contact 48 to the second movable contact 49. In the case that the switch 40 is set in a closed position (which is a conducting state), the first contact 41 is in electrical contact to the first movable contact 48 and the second contact 42 is in electrical contact to the second movable contact 49. In the case that the switch 40 is set in an open position, the first and the second contact 41, 42 are separated from the first and the second movable contact 48, 49. The operating shaft 46 sets the switch 40 in the open and in the closed position. In the embodiment shown in FIG. 1B the magnet 17 is connected to the operating shaft 46. The magnetic field sensor 21 is placed in the vicinity of the magnet 17.

Moreover, the circuit breaker 10 comprises an operating handle 52 that is mechanically coupled to the triggering device 44. A movement of the operating handle 52, for example by an operator, can set the circuit breaker 10 from the open to the closed position or vice versa.

The current I flowing from the first breaker terminal 11 to the second breaker terminal 12 can generate a temperature rise of the bimetal strip 13 that results in a triggering of the triggering device 44 such that the circuit breaker 10 is set in the open position. This is achieved by a movement of the operating shaft 46 that sets the switch 40 in the open position. Due to the mass of the bimetal strip 13 and the time constants for heating of the bimetal strip 13 a very short pulse in the current I does not result in a movement of the movable end 16 of the bimetal strip 13 that triggers the triggering device 44. However in case the current I is over a first predetermined value over a longer time (e.g. a predetermined time) the movement of the bimetal strip 13 results in a movement of the operating shaft 46 which can be detected by the magnetic field sensor 21. The movement of the operating shaft 46 results in triggering the circuit breaker 10.

The coil 43 and the triggering device 44 are configured such that the current I above a second predetermined value instantly triggers the triggering device 44 such that the switch 40 is set in the open position. The coil 43 is designed for the triggering of the triggering device 44 in case of a short circuit. Thus, a short circuit protection is realized by the coil 43.

In an example, the magnetic field sensor 21 detects whether the circuit breaker 10 is in the open or the closed position.

In an alternative embodiment, the magnet 17 is attached to a movable part of the triggering device 44. This movable part is mechanically arranged between the bimetal strip 13 and the operating shaft 46 of the switch 40. The magnet 17 may be attached to such a movable part of the triggering device 44 that is moved as a reaction to the movement of the movable end 16 of the bimetal strip 13 before the operating shaft 46 is moved for setting the switch from the closed to the open position. Thus, the magnetic field sensor 21 is able to detect the closed and the open position of the switch 40 and also intermediate states of the circuit breaker 10. Thus, the magnetic field sensor 21 is configured to detect that the current I is in an interval below the first predetermined value. In this interval the circuit breaker 10 is still in a closed position. However, the detection device 20 is able to generate the detection signal SD1 with the information that the sensor signal SE1 rises from a normal value to an interval that is close to the first predetermined value. Thus, the detection device 20 can be used for providing a warning message.

Figure 4:
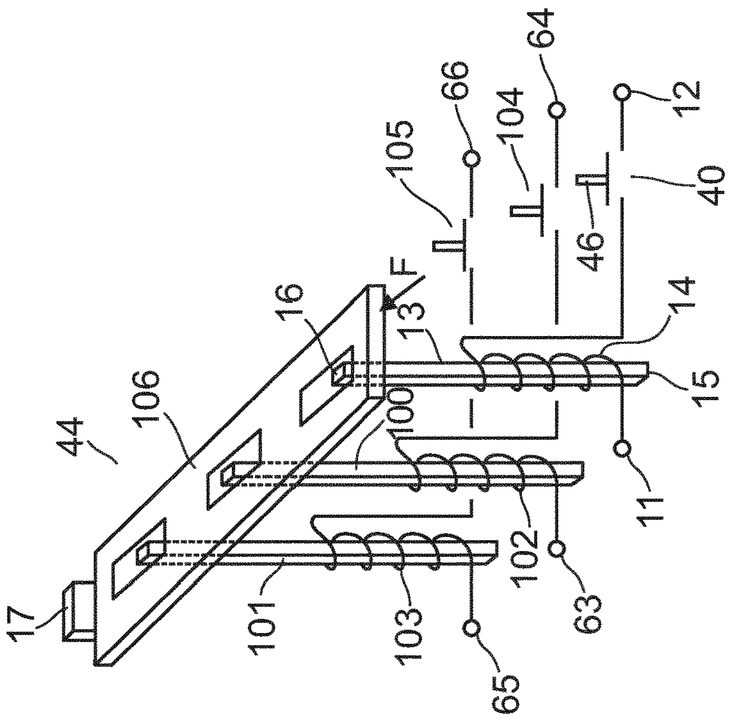
FIG. 4 shows a further example of a circuit breaker.

In an embodiment, the magnet 17 and the magnetic field sensor 21 are located as shown in FIG. 1A or 4 or as described above and detect the movement of the bimetal strip 13 and/or of the movable part of the triggering device 44 and/or of a movable bridge of the triggering device 44. The circuit breaker 10 may comprise a further magnet and the detection device 20 may comprise a further magnetic field sensor. The further magnet and the further magnetic field sensor detect whether the circuit breaker 10 is in the open or the closed position and may be located e.g. as shown in FIG. 1B.

FIG. 1C shows a further example of the circuit breaker 10 which is a further development of the examples shown in FIGS. 1A and 1B. The circuit breaker 10 comprises a first and a second housing 60, 61. The second housing 61 encloses the detection device 20. The first housing 60 encloses the bimetal strip 13, the first conduction line 14, the switch 40, the triggering device 44 and the magnet 17. The operating handle 52 is located at a front side of the first housing 60. The operating handle 52 is connected via a not-shown shaft through an opening of the first housing 60 to the triggering device 44. The first and the second breaker terminal 11, 12 are located such that they can be contacted from the outside. Moreover, the circuit breaker 10 comprises a third to a sixth breaker terminal 63 to 66. The additional breaker terminals 63 to 66 are also located at the surface of the first housing 60 such that they can be contacted from the outside. The second and the first housing 61, 60 are formed such that the second housing 61 can easily be attached to the first housing 60.

Figure 2A:
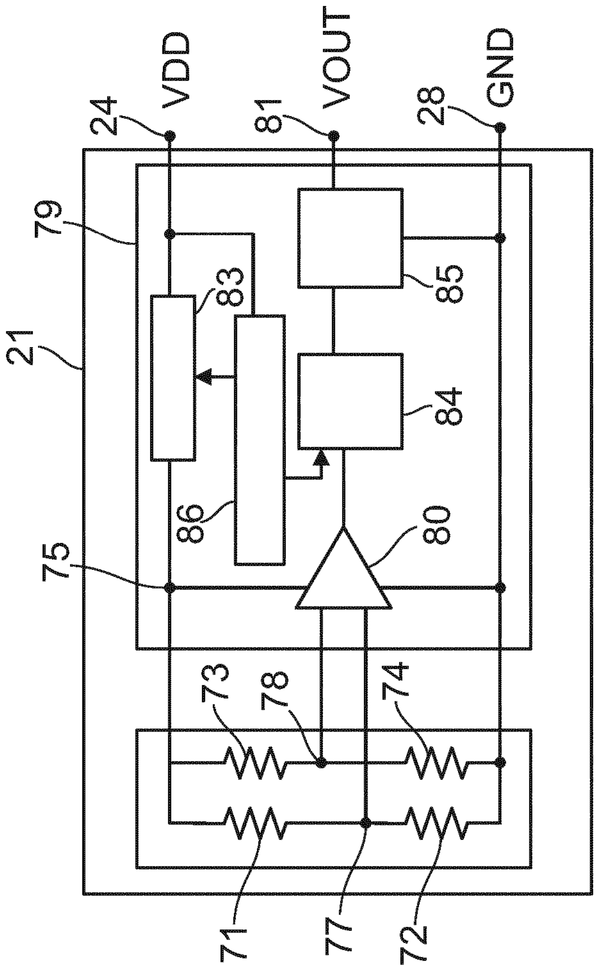
FIGS. 2A and 2B show an example of a magnetic field sensor and of a characteristic of the magnetic field sensor.
Figure 2B:
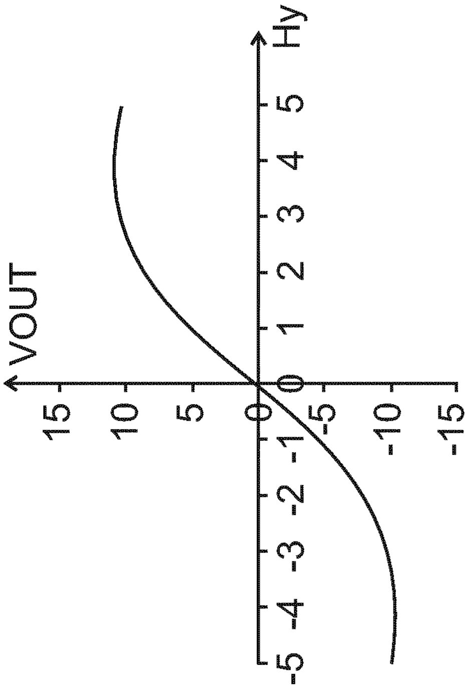

FIG. 2A shows an example of the magnetic field sensor 21 which can be used in the circuit breaker 10 as shown in FIGS. 1A to 1C. Such a magnetic field sensor 21 may be provided for example by Murata Manufacturing Company, Japan. In FIGS. 2A and 2B, a conventional magnetic field sensor 21 is explained. The magnetic field sensor 21 is implemented as a magnetic resistance sensor. The magnetic field sensor 21 is realized as anisotropic magnetic resistance sensor, abbreviated as AMR. Thus, the magnetic field sensor 21 comprises a first to a fourth resistor 71 to 74 that are connected to each other in the form of a Wheatstone bridge. The first and the second resistor 71, 72 form a first series circuit and the third and the fourth resistor 73, 74 form a second series circuit. Both series circuits are connected between a supply terminal 75 and the internal reference potential terminal 28. A first tap 77 is formed between the first and the second resistor 71, 72. A second tap 78 is formed between the third and the fourth resistor 73, 74. The first and the second tap 77, 78 are connected to a sensor circuit 79 that may be fabricated as integrated circuit. The sensor circuit 79 may be realized as a complementary metal oxide semiconductor circuit, abbreviated as CMOS circuit.

The sensor circuit 79 comprises an amplifier 80 having two inputs that are connected to the first and the second tap 77, 78. The output of the amplifier 80 is coupled to a signal output 81 of the magnetic field sensor 21. The supply voltage terminal 24 of the detection device 20 may be coupled to the supply terminal 75, for example via a switch 83. The sensor circuit 79 may comprise a latching circuit 84 and a further circuit 85 that couple the output of the amplifier 80 to the signal output 81 of the magnetic field sensor 21. A sampling circuit 86 of the sensor circuit 79 is connected to a terminal of the switch 83, to the supply voltage terminal 24 and to an input of the latching circuit 84.

Advantageously, the magnetic field sensor 22 realized as AMR sensor has a small sensor package, a high sensitivity and a high reliability. The magnetic field sensor 22 may be provided in a Small Outline Transistor package, abbreviated SOT package.

FIG. 2B shows an example of a characteristic of the magnetic field sensor 21 as shown in FIG. 2A. In FIG. 2B, the output voltage VOUT is shown as a function of a magnetic field strength Hy that is measured in the y-direction. Moreover, an auxiliary magnetic field Hx is applied to the magnetic field sensor 21 in the x-direction. The magnetic field sensor 21 may be configured to detect linear movements of the magnet 17.

In an alternative embodiment, not shown, the magnetic field sensor 21 can be realized using another sensor, such as for example a Hall-effect sensor.

Figure 3:
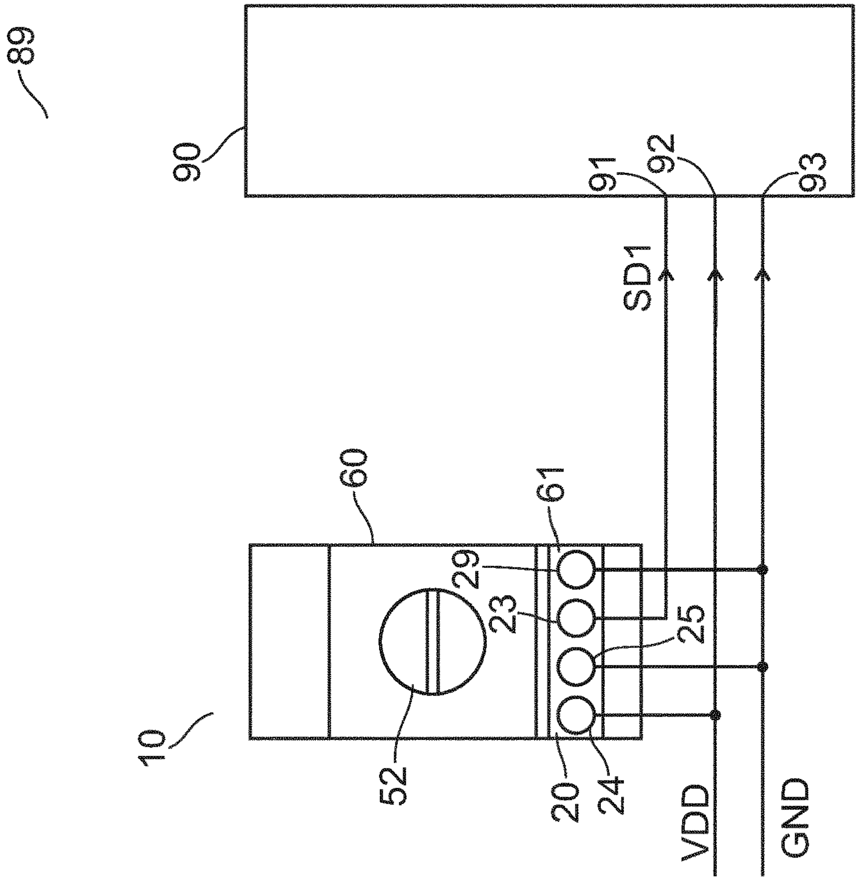
FIG. 3 shows an example of an arrangement comprising the circuit breaker.

FIG. 3 shows an example of an arrangement 89 comprising the circuit breaker 10 as explained in the figures above. The arrangement 89 additionally comprises a control device 90. The control device 90 may be realized as a programmable logic controller or memory programmable controller, abbreviated as PLC. The control device 90 comprises an input terminal 91 connected to the first output terminal 23 of the circuit breaker 10. Moreover, the control device 90 comprises a supply voltage terminal 92 and a reference potential terminal 93. The supply voltage terminal 92 is connected via connection lines to the supply terminal 24 of the circuit breaker 10 and to a non-shown supply voltage source. The reference potential terminal 93 of the control device 90 is connected via connection lines to a ground potential terminal and to the reference potential terminals 25, 29 of the detection device 20.

The input terminal 91 is a digital input. The input terminal 91 receives the detection signal SD1. The control device 90 is configured to evaluate the pulse width modulated detection signal SD1. The detection signal SD1 has a low frequency. Thus, the control device 90 is able to evaluate the detection signal SD1. Due to the low frequency of the detection signal SD1, the timing in the control device 90 is not critical. Advantageously, the circuit breaker 10 can communicate the detection signal SD1 to the control device 90. Thus, an increase of the current I can be detected by the detection device 20 and can be provided to the control device 90. Thus, the control device 90 or a further controller connected to the control device 90 can make amendments in an apparatus connected to this arrangement 89, for example by amending a condition of a motor connected to the circuit breaker 10. Thus, the arrangement 89 can react on a rise of the current I before the triggering device 44 of the circuit breaker 10 interrupts the flow of the current I.

The control device 90 processes the detection signal SD1 that indicates an overload warning and may provide a warning information, a maintenance information and/or a switch off signal. The ZMR function could be realized also with a standard circuit breaker and a contactor (which may be named e.g. DILM contactor). The control device 90 may comprise a standard interface connected to the input terminal 91. A software of the control device 90 is configured to evaluate the detection signal SD1, especially a pulse-width modulated detection signal SD1.

FIG. 4 shows a further example of the circuit breaker 10 that is a further development of the examples shown above. As explained above, the circuit breaker 10 may comprise a first to a sixth breaker terminal 11, 12, 63 to 66. Thus, the circuit breaker 10 additionally comprises a further and an additional bimetal strip 100, 101, a second and a third conduction line 102, 103 and a further and an additional switch 104, 105. The third breaker terminal 63 is coupled via the second condition line 102 and the further switch 104 to the fourth breaker terminal 64. Correspondingly, the fifth breaker terminal 65 is coupled via the third conduction line 103 and the additional switch 105 to the sixth breaker terminal 66.

The triggering device 44 is connected on its input side not only to the bimetal strip 13, but also to the further and the additional bimetal strip 100, 101. On its output side the triggering device 44 is connected not only to the switch 40 but also to the additional and the further switch 104, 105. To reduce the complexity of FIG. 4, further parts of the circuit breaker 10 such as the three coils, the operating handle 52 and most parts of the triggering device 44 are omitted.

The three bimetal strips 16, 100, 101 are connected in an OR combination by the triggering device 44. Thus, a movement of one of the three bimetal strips 16, 100, 101 is sufficient to trigger the triggering device 44 such that the triggering device 44 sets the three switches 40, 104, 105 in an open position. The magnet 17 may be fixed at the triggering device 44.

The triggering device 44 comprises a movable bridge 106. The movable bridge 106 connects the three bimetal strips 13, 100, 101. The movable bridge 106 performs an OR-function of the movement of the three bimetal strips 16, 100, 101. The movable bridge 106 is coupled via other parts (not shown) of the triggering device 44 to the operating shafts of the three switches 40, 104, 105. Thus, the circuit breaker 10 includes three current paths which are connected in parallel and can be switched on and off by the three switches 40. The three switches 40 are simultaneously operated.

In FIG. 4, the three bimetal strips 13, 100, 101 are differently bended. A small force F is exerted on the movable bridge 106. Thus, the bimetal strip which has the highest temperature of the three bimetal strips 13, 100, 101 determines the position of the movable bridge 106 (in FIG. 4, the bimetal strips 13 and 101 determine the position of the movable bridge 106). The magnet 17 is fixed at the movable bridge 106. Thus, the position of the bimetal strip which has the highest temperature is detected by the detection device 20.

The motor-protective circuit breaker 10 protects motor or transformer loads against overload and short circuit. The operating principle for overload detection is based on the mechanical force effect of bimetals. Due to the excessive current, the bimetals in the circuit breaker 10 (three pieces due to three-phases) are moved mechanically, which causes the circuit breaker 10 to trip. After the mechanical overload tripping, the main current paths are separated by the circuit breaker 10 and thus e.g. the motor load is switched off. Advantageously, the overload status and/or the time to tripping of the circuit breaker 10 can be detected with the detection device 20. The detection device 20 alone or the detection device 20 in combination with the control device 90 may determine at least one of:

The circuit breaker 10 has been switched off after overload tripping.

The circuit breaker 10 is shortly before a point of time of overload tripping.

The circuit breaker 10 has been switched off after a short circuit.

An overload or a short circuit has caused the tripping of the circuit breaker 10.

The circuit breaker 10 provides an information about the overload situation using the detection device 20. The detection and evaluation of the overload situation is achieved by the magnet 17 that is a permanent magnet and the AMR sensor 22. The magnet 17 may be fixed at the movable bridge 106 that connects the three bimetal strips 13, 100, 101 and is part of the triggering device 44. The magnetic field sensor 22 (e.g. an AMR sensor) is located in the second housing 61 that may optionally include further circuit parts. The magnetic field sensor 22 is located such that it senses the movement of the magnet 17 and thus also the movement of the movable bridge 106. The movement per time can be related to the overload state of the circuit breaker 10 (e.g. by the detection device 20 itself or by the control device 90) and thus realizes a measurement.

The magnetic field sensor 21 is connected to the control circuit 22 for evaluation. The detection device 20 can be inserted in the second housing 61 that may be similar to a housing of an auxiliary switch. The detection device 20 can be optionally retrofitted. The magnet 17 has to be retrofitted also or is fixed in the circuit breaker 10 regardless of whether a customer intends to add the detection device 20. The detection device 20 may, for example, provide the overload status by the detection signal SD1 in form of a PWM signal at the first output terminal 23 that is a digital output. The detection signal SD1 can be evaluated by a higher-level control device 90.

Alternatively, the detection device 20 comprises two output terminals which provide the detection signal SD1 and a further detection signal e.g. at 105% and 115% overload. The detection signal SD1 and the further detection signal may be static signals.

Alternatively, the circuit breaker 10 includes exactly one current path (as shown in FIG. 1A) or includes two or more than three current paths.

The embodiments shown in FIGS. 1A to 4 as stated represent examples of the improved circuit breaker; therefore, they do not constitute a complete list of all embodiments according to the improved circuit breaker. Actual circuit breakers may vary from the embodiments shown in terms of parts, structures and shape, for example. The words "state" and "position" might be interchanged.

LIST OF REFERENCE NUMERALS

10 circuit breaker
11 first breaker terminal
12 second breaker terminal
13 bimetal strip
14 first conduction line
15 fixed end
16 movable end
17 magnet
20 detection device
21 magnetic field sensor
22 control circuit
23 first output terminal
24 first supply terminal
26 smoothing capacitor
25 reference potential terminal
27 protection device
28 internal reference potential terminal
29 second output terminal
40 switch
41, 42 contact
43 coil
44 triggering device
46 operating shaft
48, 49 movable contact
50 contact bridge
52 operating handle
60 first housing
61 second housing
63 to 66 breaker terminal
71 to 74 resistor
75 supply terminal
77, 78 tap
79 sensor circuit
80 amplifier
81 signal output
83 switch
84 latching circuit
85 further circuit
86 sampling circuit
89 arrangement
90 control device
91 input terminal
92 supply voltage terminal
93 reference potential terminal
100, 101 bimetal strip
102, 103 conduction line
104, 105 switch
106 movable bridge
F force
GND reference potential
I current
HY, HX magnetic field strength
SD1 detection signal
SE1 sensor signal
VDD supply voltage
VOUT output voltage

The invention claimed is:

1. A circuit breaker, the circuit breaker comprising:
a first and a second breaker terminal;
a bimetal strip;
a first conduction line;
a switch comprising a first contact and a second contact, wherein the first conduction line is electrically coupled to the first breaker terminal and to the first contact of the switch;
a triggering device mechanically coupling the bimetal strip to the switch;
a magnet connected to at least one of the bimetal strip, the triggering device, or the switch;
a detection device comprising a magnetic field sensor configured to detect a magnetic field of the magnet and a control circuit connected to the magnetic field sensor;
a first housing, which at least encloses the bimetal strip, the first conduction line, the switch, the triggering device and the magnet, wherein the first conduction line is wound around the bimetal strip; and
a second housing which at least encloses the detection device,
wherein the magnetic field sensor is outside of the first housing and is configured to detect a movement of the magnet inside the first housing.

2. The circuit breaker of claim 1, wherein the first conduction line comprises a wire or a conducting strip that is spiraled around the bimetal strip.

3. The circuit breaker of claim 1, wherein the triggering device is configured to set the switch in an open position in case the bimetal strip is heated above a predetermined temperature by current that flows through the first conduction line.

4. The circuit breaker of claim 1, wherein the triggering device is configured to convert a movement of a movable end of the bimetal strip to a movement of an operating shaft of the switch.

5. The circuit breaker of claim 1, wherein the magnetic field sensor comprises a magnetic resistance sensor.

6. The circuit breaker of claim 5, wherein magnetic resistance sensor is realized as one of an anisotropic magnetic resistance sensor, giant magnetic resistance sensor, or a tunneling magnetic resistance sensor.

7. The circuit breaker of claim 1, wherein the magnetic field sensor comprises a Hall-effect sensor.

8. The circuit breaker of claim 1, wherein the detection device is configured to convert a position information of the position of the magnet into a detection signal.

9. The circuit breaker of claim 8, wherein the detection signal is realized as a pulse-width modulated signal.

10. The circuit breaker of claim 8, wherein the detection device is configured to convert the position information of the position of the magnet into a further detection signal, wherein the detection signal is set in case a load is above a first threshold, and wherein the further detection signal is set in case the load is above a second threshold.

11. The circuit breaker of claim 1, wherein the detection device comprises at least a first output terminal, wherein the control circuit is connected to the magnetic field sensor and to the at least a first output terminal.

12. The circuit breaker of claim 1, wherein the shape of the first housing and the shape of the second housing are adapted to each other.

13. The circuit breaker of claim 1, wherein the circuit breaker comprises an operating handle that is configured to manually set the circuit breaker in an open or a closed position and is mechanically connected to the triggering device.

14. The circuit breaker of claim 1, wherein the first contact and the second contact of the switch are both fixed contacts, and wherein the switch additionally comprises a first moveable contact, a second movable contact, and a contact bridge coupling the first movable contact to the second movable contact.

15. A method for operating a circuit breaker, the method comprising:

flowing a current from a first breaker terminal to a second breaker terminal via a first conduction line and a switch;

heating a bimetal strip via the first conduction-line, wherein the bimetal strip is mechanically coupled to the switch via a triggering device;

moving a magnet as a function of the heat provided to the bimetal strip, wherein the magnet is connected to at least one of the bimetal strip, the triggering device, or the switch; and detecting a magnetic field of the magnet by a detection device comprising a magnetic field sensor and a control circuit connected to the magnetic field sensor, wherein the circuit breaker comprises a first housing, which at least encloses the bimetal strip, the first conduction line, the switch, the triggering device, and the magnet, wherein the first conduction line is wound around the bimetal strip, wherein the circuit breaker further comprises a second housing which at least encloses the detection device, and wherein the magnetic field sensor is outside of the first housing and is configured to detect a movement of the magnet inside the first housing.

* * * * *